(12) United States Patent
Maricevic et al.

(10) Patent No.: US 12,199,673 B2
(45) Date of Patent: Jan. 14, 2025

(54) FIBER-ENABLED BACKFEED NETWORK ARCHITECTURE

(71) Applicant: ARRIS Enterprises LLC, Suwanee, GA (US)

(72) Inventors: Zoran Maricevic, West Hartford, CT (US); John Ulm, Pepperell, MA (US); John Caezza, Farmington, CT (US); Stuart Eastman, Wallingford, CT (US)

(73) Assignee: ARRIS Enterprises LLC, Suwanee, GA (US)

( * ) Notice: Subject to any disclaimer, the term of this patent is extended or adjusted under 35 U.S.C. 154(b) by 323 days.

(21) Appl. No.: 17/521,653

(22) Filed: Nov. 8, 2021

(65) Prior Publication Data
US 2022/0158733 A1  May 19, 2022

Related U.S. Application Data

(60) Provisional application No. 63/114,335, filed on Nov. 16, 2020.

(51) Int. Cl.
| | |
|---|---|
| *H04B 10/2575* | (2013.01) |
| *H04B 10/40* | (2013.01) |
| *H04N 7/22* | (2006.01) |
| *H04Q 11/00* | (2006.01) |

(52) U.S. Cl.
CPC ....... *H04B 10/25751* (2013.01); *H04B 10/40* (2013.01); *H04N 7/22* (2013.01); *H04Q 11/0066* (2013.01); *H04Q 11/0067* (2013.01); *H04Q 2011/0086* (2013.01); *H04Q 2011/0088* (2013.01)

(58) Field of Classification Search
CPC ............... H04Q 11/0067; H04B 10/25751
See application file for complete search history.

(56) References Cited

U.S. PATENT DOCUMENTS

| | | | |
|---|---|---|---|
| 10,211,922 B2 | 2/2019 | Mutalik et al. | |
| 2009/0052901 A1* | 2/2009 | Cagle | H04B 10/25891 398/116 |
| 2016/0043806 A1 | 2/2016 | Maricevic et al. | |
| 2017/0302378 A1* | 10/2017 | Mutalik | H04Q 11/0067 |
| 2018/0213305 A1* | 7/2018 | Campos | H04J 14/0271 |
| 2020/0136742 A1* | 4/2020 | Campos | H04J 14/0212 |

* cited by examiner

*Primary Examiner* — Shi K Li
(74) *Attorney, Agent, or Firm* — Chernoff, Vilhauer, McClung & Stenzel, LLP

(57) ABSTRACT

A CATV system having an aggregator node and at least one compact node. The aggregator node receives downstream signals from a head end and sends upstream signals to the head end. The at least one compact node receives downstream signals from the aggregator node and send upstream signals to the aggregator node. The at least one compact node sends the downstream signal received from the aggregator node to a subscriber positioned in the upstream direction relative to the compact node.

10 Claims, 15 Drawing Sheets

FIBER-ENABLED BACKFEED NETWORK ARCHITECTURE

CROSS REFERENCE TO RELATED APPLICATIONS

This application claims the benefit of U.S. Provisional Patent Application No. 63/114,335 filed Nov. 16, 2021.

BACKGROUND

The subject matter of this application relates to communications networks for delivering multimedia content and Internet services, such as CATV network architectures, and more specifically to such architectures and devices therein that provide, or migrate to, a node-plus-zero (N+0) architecture.

Cable TV (CATV) systems were initially deployed as video delivery systems that, in their most basic form received video signals at a cable head end, processed the signals for transmission, and broadcast them to homes via a tree-and-branch coaxial cable network. In order to deliver multiple TV channels concurrently, early CATV systems assigned 6 MHz blocks of frequency to each channel and Frequency Division Multiplexed (FDM) the channels onto the coaxial cable RF signals. Electrical amplifiers were inserted along the transmission path to boost the signal, and splitters and taps were deployed to deliver the signals to individual homes.

As the reach of the systems increased, the signal distortion and operational costs of long chains of electrical amplifiers became problematic, hence over time larger segments of the coaxial cable in the tree-and-branch transmission network were replaced with fiber optic cables, creating a Hybrid Fiber Coax (HFC) network. Hybrid Fiber-Coaxial (HFC) Networks, originally intended for "Cable-TV" only delivery, have also become the primary means of high-speed data service delivery in many countries, mainly because such networks must support an exacting noise requirement (e.g. ~50 dB SNR), which enabled the Data Over Cable Service Interface Specification (DOCSIS) standard to "pack" many Megabits per second into the spectrum available for data delivery. Also, an HFC architecture is readily upgradeable to expand data capacity and to this end, HFC architectures have evolved to deliver an increasing amount of content to subscribers at ever-higher speeds. Such services include IP packet-based services, but are propagated on the HFC network as additional frequency blocks that use FDM to share the spectrum along with video services. Unlike broadcast video, each IP stream is unique. Thus, the amount of spectrum required for data services is a function of the number of data users and the amount of content they are downloading. With the rise of the Internet video, this spectrum is growing at 50% compound annual growth rate and putting significant pressure on the available bandwidth. Pressure on the available bandwidth has further increased with the advent of narrowcast video services such as video-on-demand (VOD), which changes the broadcast video model as users can select an individual program to watch and use VCR-like controls to start, stop, and fast-forward. In this case, as with data service, each user requires an individual program stream.

Unlike broadcast video, data services require a two-way connection. Therefore, the cable plant must provide a functional return path, i.e., data communication between the CATV head end and subscribers includes a downstream path that delivers video and data to subscribers, along with a return path that delivers data from the subscribers to the head end. To prevent interference between the upstream and downstream signals when transmitted over HFC network, separate ranges of bandwidth were dedicated to these upstream and downstream signals respectively, such that a smaller, low-frequency range of the total transmission spectrum (for the upstream signal) was "split" from a larger, higher frequency range (for the downstream signal). As can easily be appreciated, as more video content and faster data services are provided via the HFC network over time, the "split" between the upstream and downstream paths must change. Historically, HFC systems have supported several different splits, including 42/54 MHz and 65/85 MHz splits, where the first number denotes the highest frequency in the upstream and the second number denotes the lowest frequency in the downstream. The frequencies in between are not used for neither upstream or downstream, but as a "guard band" to eliminate any spurious leakage of upstream signals into the downstream spectrum and vice versa. The DOCSIS 3.0 standard introduced an 85/108 MHz split, but this split not been widely deployed due to the difficulties of moving legacy services (e.g. STB control channel, FM channels) from existing 54-108 MHz spectrum reserved for downstream content. Moreover, the DOCSIS 3.1 standard further contemplates a significant increase in upstream spectrum, and associated capacity, with the option of a 204/258 MHz upstream split with the corresponding downstream spectrum starting at 258 MHz's This however exacerbates the difficulties arising from supporting legacy downstream services in the 54-258 MHz range.

The HFC network uses optical fiber to deliver the RF broadcast content from the head end to the remaining segments of coaxial cable in the network neighborhood transmission network, which in turn delivers it to the subscribers. Optical nodes in the network acted as optical to electrical converters to provide the fiber-to-coax interfaces.

Over the years, HFC is continually evolving to push fiber deeper into the network. Eventually, it will reach the point where it becomes a Fiber to the Premise (FTTP) architecture, but this may take decades at an economical pace. FTTP is happening today in new Greenfield deployments, yet there are significant operational challenges to make this transformation in existing HFC infrastructure, a.k.a. Brownfields.

Rather than migrate to new architectures, such as fiber-to-the-premises (FTTP) where fiber replaces all portions of the CATV network, many existing CATV providers have tended to squeeze as much content and services as possible over the existing CATV architecture. However, the capacity of the existing HFC architecture is limited, and this solution will be adequate for only so long.

What is desired, therefore, are improved network architectures, and devices within those architectures, that transition towards an FTTP architecture.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

As noted previously, it may ultimately be desirable to replace existing communications networks such as an HFC network with a Fiber-to-the-Home (FTTH) architecture, but an instantaneous implementation of such an upgrade is cost-prohibitive in relation to the current demand for services/bandwidth. However, such demand is growing and therefore gradual upgrades towards an FTTH architecture are occurring. Such upgrades have historically included augmenting upstream and downstream bandwidth through hardware replacements and shifting the splits between upstream and downstream paths, as well as Physical Layer (PHY), Medium Access Control (MAC) and management layer placement deeper into the network (collectively referred to as a Distributed Access Architecture (DAA) so as to push fiber deeper into the HFC network. The last aspect is often referred to as "network evolution," exemplified by successive NOx architectures, where the last node is followed by a cascade of "x" number of RF amplifiers to the taps feeding customers, and the number "x" grows smaller in successive architecture evolutions. Thus, in a Node+0 architectures, the "fiber-deep" nodes are the only active elements (actives) in the network, followed by taps on the coax section, with no intervening active RF amplifiers. Achieving an N+0 architecture not only enables very small Service Groups (SG), but maximizes plant capacity by enabling higher modulations, higher frequencies such as those discussed in DOCSIS 4.0 Extended Spectrum; and potentially DOCSIS 4.0 Full-Duplex (FDX) operation. These are key technologies in the Cable 10G™ initiative.

To illustrate an Nyx architecture migration path, consider an "N+5" architecture with one fiber-optic node followed by approximately 25 RF amplifiers and 150 hardline taps, serving about 500 homes-passed (HP). If this node-serving area were to be upgraded to a fiber-deep N+0 architecture, the total number of actives will fall to between five and ten depending on the plant density i.e., number of HP per mile of hardline coax plant. That is a significant reduction in the number of actives that need to be powered and maintained. Nevertheless, this upgrade is achieved at the cost of having to overlash approximately 50% of the hardline coax with fiber, add an additional 10-15% of new coaxial runs, and change about 65% of all taps/tap faceplates in order to match those values to the N+0 "rules". In addition to this significant material/labor cost, the upgrade is time-consuming and involves significant down time for the subscribers in the affected area. Thus, although the ultimate benefits of this upgrade are great, the transitory costs are also significant.

Figure 1:
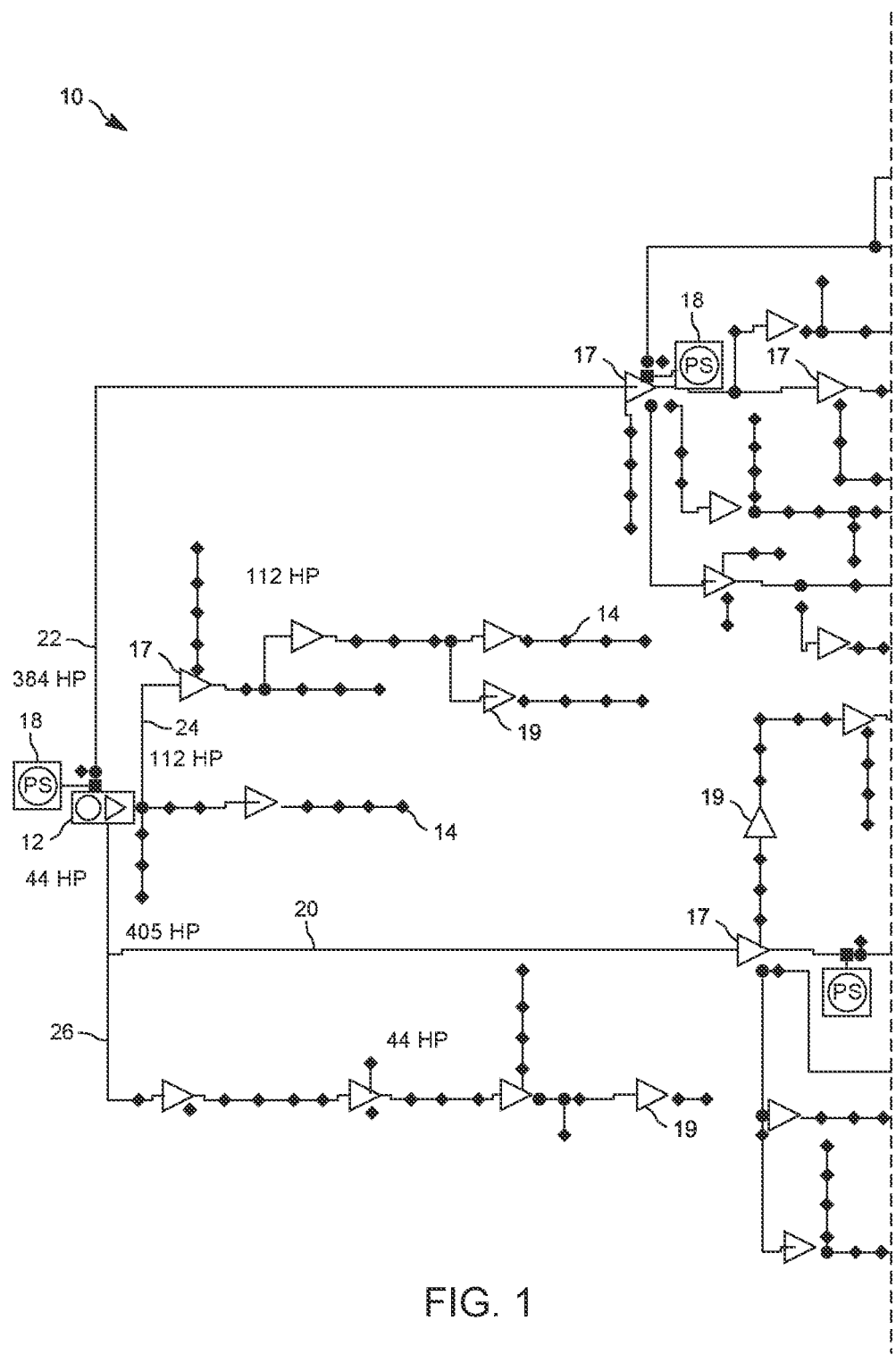
FIG. 1 shows an HFC network with 945 Homes-passed in an N+5 topology served by a single node.
Figure 1:
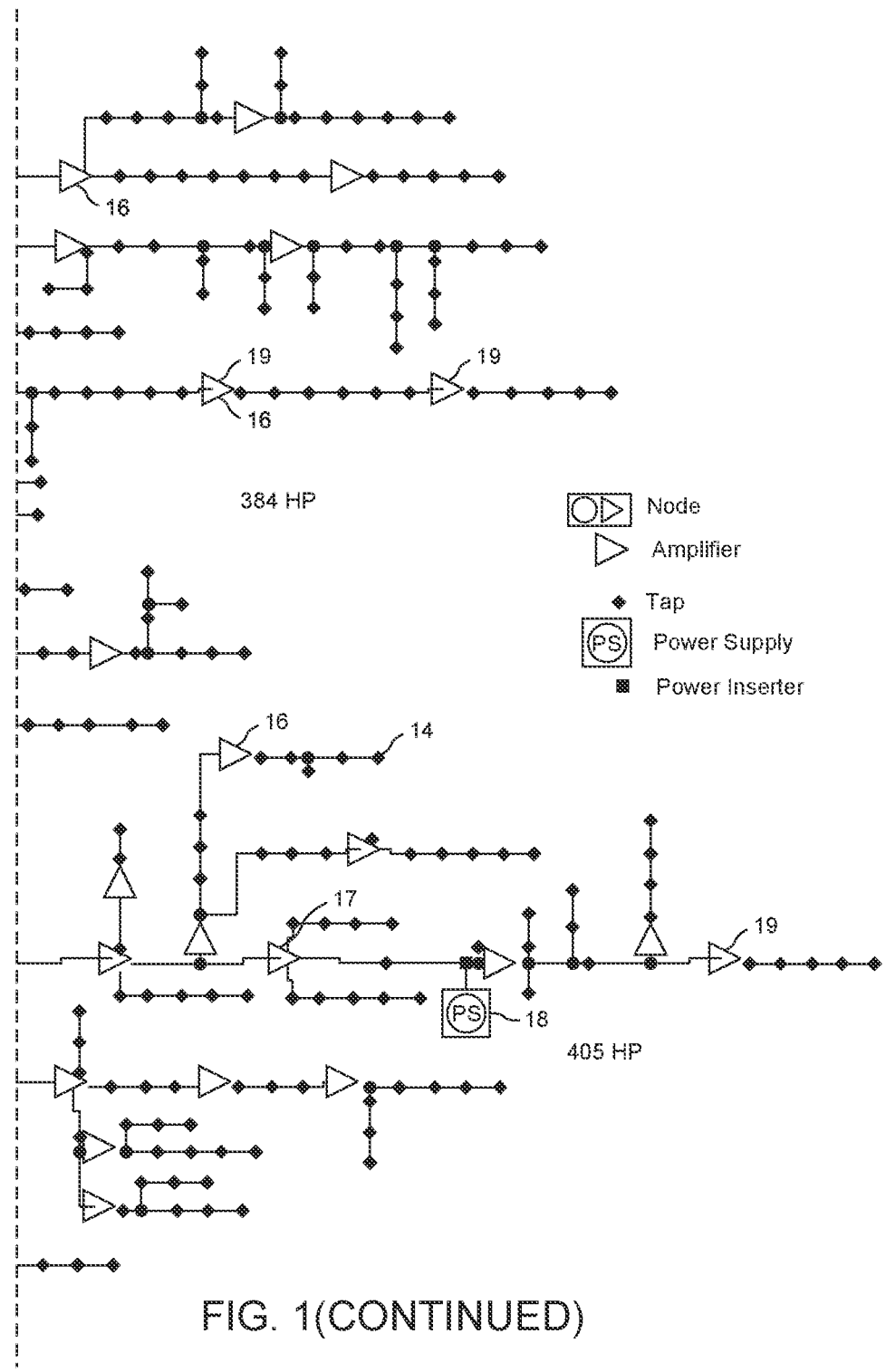

Disclosed below is a novel alternative architecture that is capable of migration to an N+0 system, with significantly reduced transitory cost relative to the benefits achieved. FIG. 1 illustrates an architecture having exemplary node-serving area 10 under consideration as the starting point for the network upgrades discussed in the present disclosure. In the node-serving area a node 12 provides content to a set of subscribers (homes passed), each subscriber receiving service via a respective tap 14. In order to deliver content to the large number of taps 14 through the branched network shown, multiple amplifiers 16 must be used, as well as multiple power supplies 18 distributed through the network. Table 1 shows some statistics of the node serving area e.g. density as reflected in Homes-Passed per Mile (98), with 4.3 RF Amplifiers per mile and correspondingly about 23 HP per amplifier, which are statistics representative of a typical HFC network. Out of the 42 total RF amplifiers, twelve are of the "bridger" type 17, i.e. with two or more RF outputs, and the rest (30), are of the "Line Extender" (LE) type 19, i.e. with 1 RF output. The unequal distribution of number of Homes-Passed per node leg is also shown in the Table 1 and further highlighted in FIG. 1

TABLE 1

|  | Leg 1 | Leg 2 | Leg 3 | Leg 4 | Total |
| --- | --- | --- | --- | --- | --- |
| HP | 405 | 384 | 112 | 44 | 945 |
| Taps | 118 | 119 | 30 | 19 | 286 |
| RF Amps | 19 | 14 | 5 | 4 | 42 |
| HP/Mile |  |  |  |  | 98 |
| Amps/Mile |  |  |  |  | 4.3 |
| HP/Amp |  |  |  |  | 23 |
| Taps/Amp |  |  |  |  | 6.8 |
| HP/Tap |  |  |  |  | 3.3 |
| 9.7 | Miles |  | of Hardline Plant |  |  |

There are many reasons to upgrade the network illustrated in FIG. 1, most obviously because the size of the node service group with 945 HP is too large—given that less than 250 HP has become the de facto target today to provide the level of service demanded. However, to reduce the service group size by segmenting the network into four groups would be difficult, given the unequal 405, 384, 112 and 44 distribution of HP per node legs 20, 22, 24, and 26, respectively. Furthermore, the frequency split of 5 to 42 MHz upstream and 54 to 750 MHz downstream is considered restrictive already, and likely unable to meet capacity demand, which expected to grow by approximately 30% annually through the 2020s. Also, the distance between the node and the furthest subscriber is as high as 7,000 feet and the cascade depth of five amplifiers deep is not conducive to future bandwidth expansions; for example, DOCSIS 4.0 envisions supporting only up to N+4 cascades for 1,794 MHz in the downstream, and even then, shorter is much better.

Figure 2:
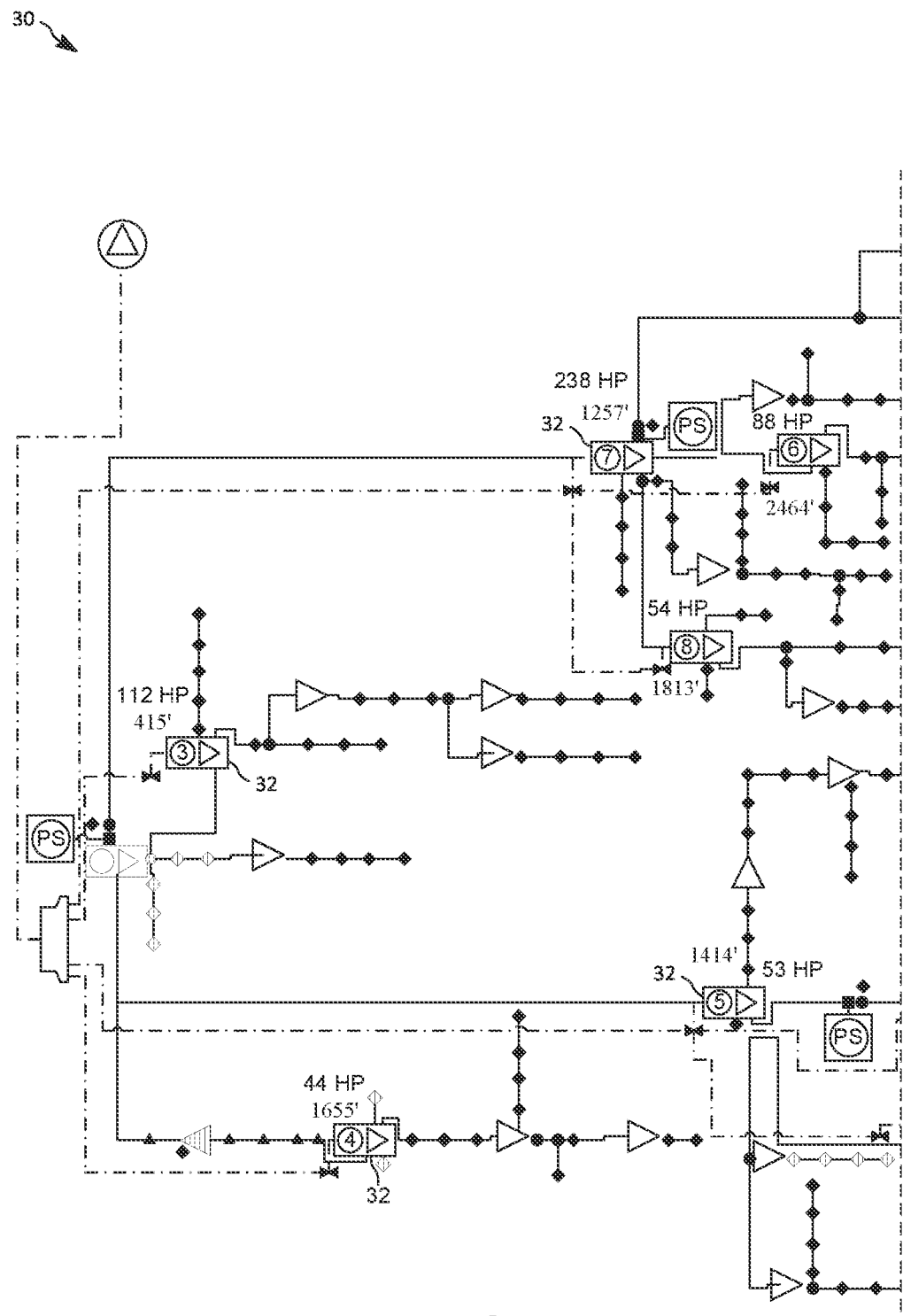
FIG. 2 shows the HFC system of FIG. 1 converted to an N+2 topology using eight nodes.
Figure 2:
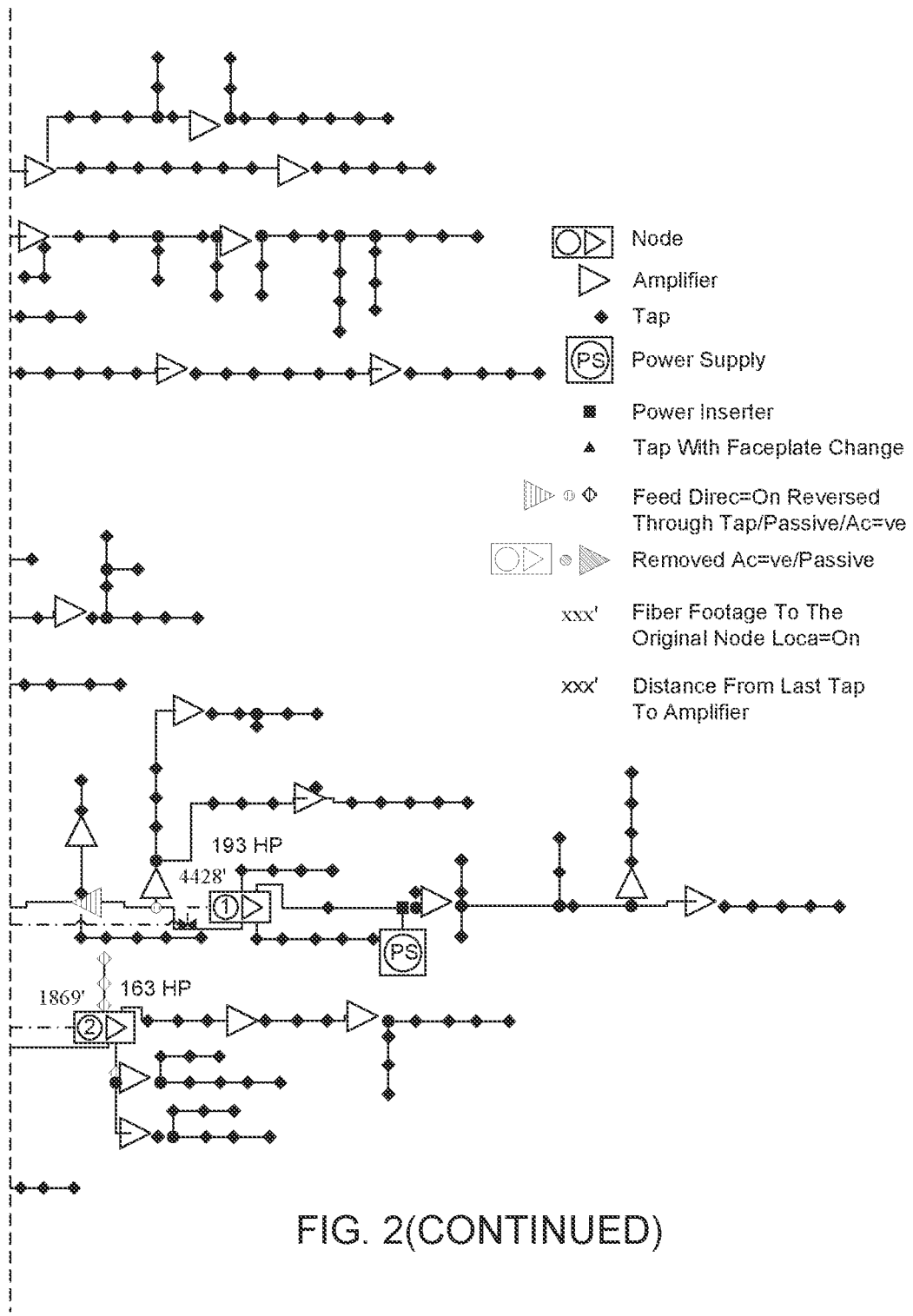

Accordingly, several upgrade migrations for the system of FIG. 1 might be considered. FIG. 2 shows one possible network upgrade to a node-serving area 30 to consider, where the N+5 architecture is replaced with an N+2 upgrade. In this example, the single node 12 of FIG. 1 is replaced by eight nodes 32 by converting eight of the bridger amplifiers 17 to nodes 32, while all 30 LEs 19 remain unmodified. To reach those nodes 32, about 1.9 miles of fiber is overlashed on top of the hardline plant, i.e., 19% of it, from the original node location 12 to the new nodes 32. The resulting eight nodes 32 could be organized into four service groups, each with fewer than 250 HP, as shown in Table 2. Fiber to the last subscriber distance is reduced to about 2,500 feet.

TABLE 2

| N + 2 Node # | SG #1 | SG #2 | SG #3 | SG #4 | Total |
| --- | --- | --- | --- | --- | --- |
| 1 | 193 |  |  |  |  |
| 2 |  | 163 |  |  |  |
| 3 |  |  |  | 112 |  |
| 4 |  |  |  | 44 |  |
| 5 | 53 |  |  |  |  |
| 6 |  |  |  | 88 |  |
| 7 |  |  | 238 |  |  |
| 8 |  | 54 |  |  |  |
|  | 246 | 217 | 238 | 244 | 945 |
| 1.9 | Miles |  | of Fiber Overlash |  |  |

Figure 3:
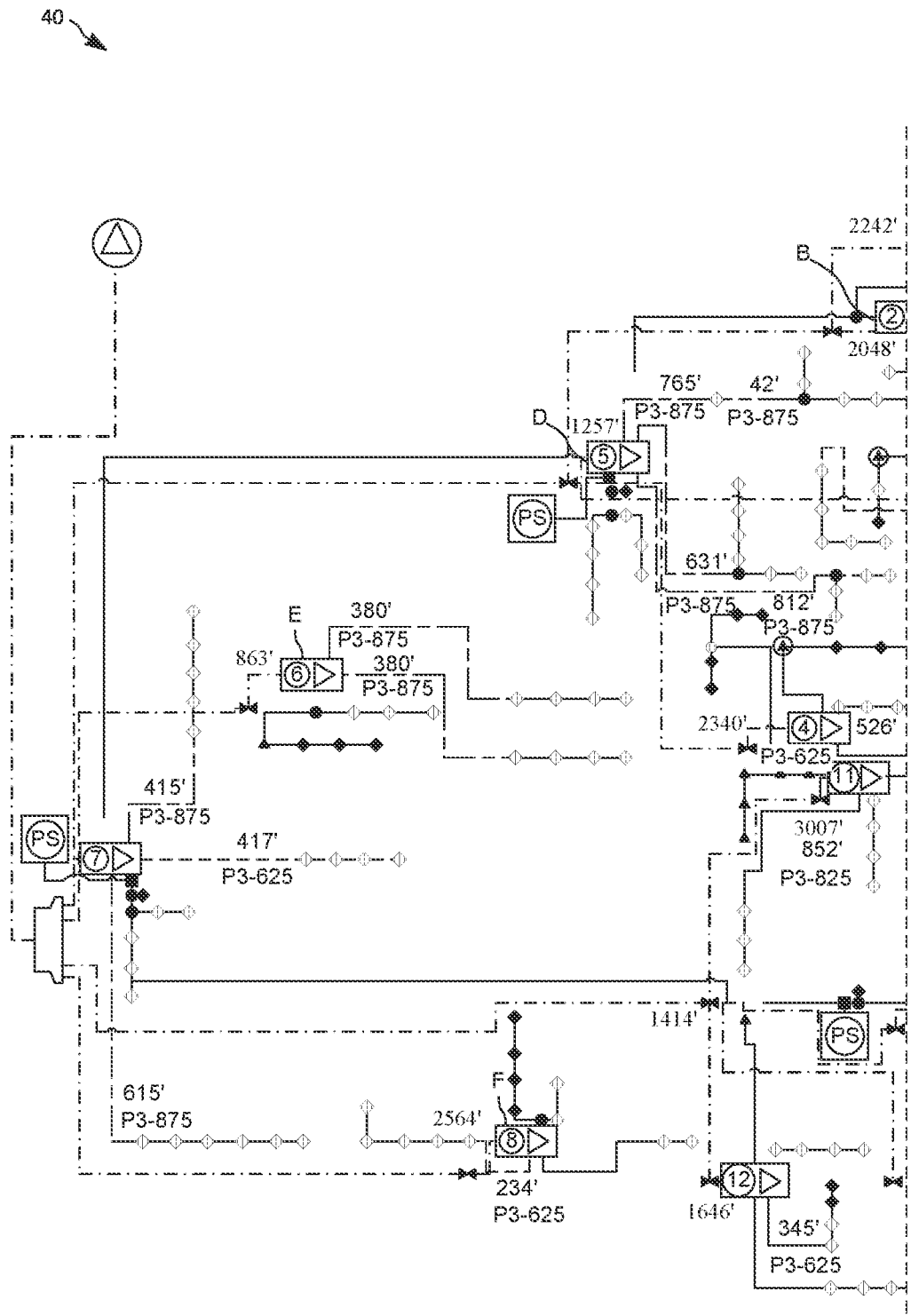
FIG. 3 shows the HFC system of FIG. 1 converted to an N+0 topology using fifteen nodes.
Figure 3:
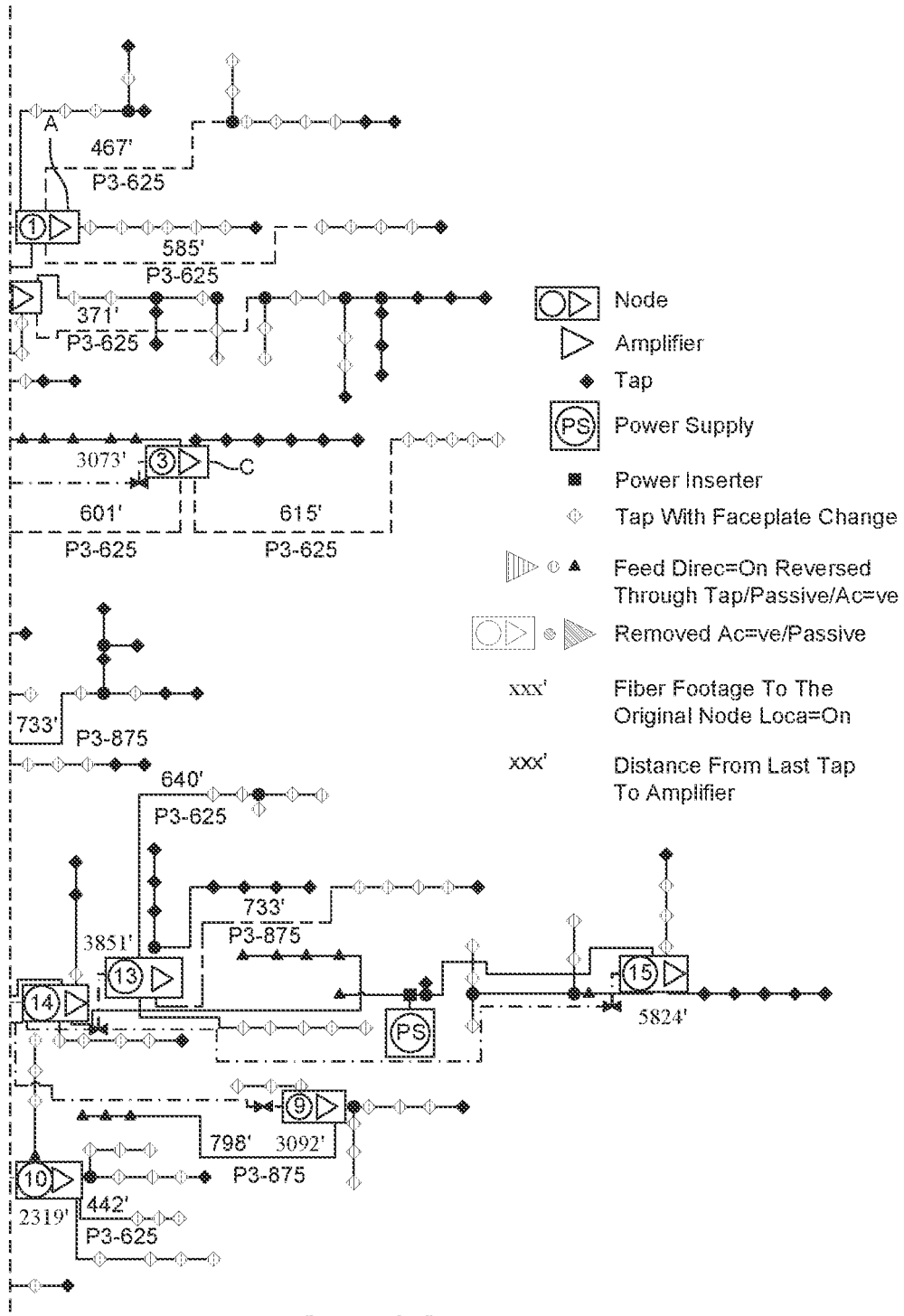

FIG. 3 shows an alternative network upgrade converts the N+5 network of FIG. 1 to an N+0 "fiber-deep" network 40. As the name "fiber deep" implies, the fiber is extended deeper into the HFC network, with all active amplifiers removed between the node and the subscriber. The fiber to the last subscriber distance is now approximately 1,600 feet. In addition to requiring about 4.1 miles of the fiber overlash (over 42% of the hardline plant), an additional 2.4 miles (24%) of the new hardline coax is also needed to accommodate coaxial routing changes. This equates to about two thirds of the original hardline plant needing reconstruction. Furthermore, 208 (73%) of 286 taps need to either have their tap value and/or signal direction changed. As a result, the total number of field actives drops to fifteen, from the original 42+1, and the ability to organize those fiber-deep nodes into at least 4 service groups, even more granular than that of N+2 is gained.

Figure 4:
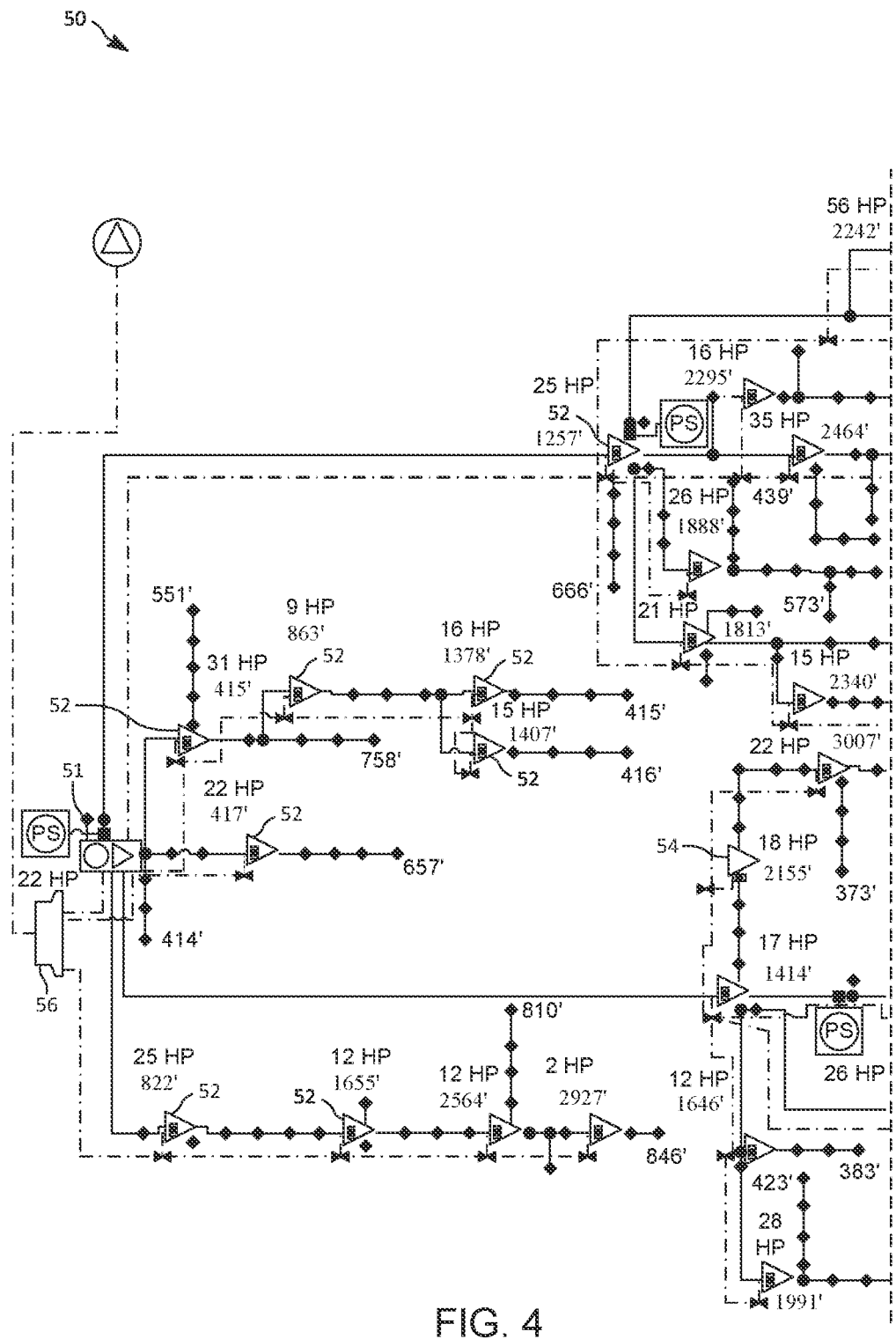
FIG. 4 shows the HFC system of FIG. 1 converted to an N+0 topology using a 42-node distributed node architecture.
Figure 4:
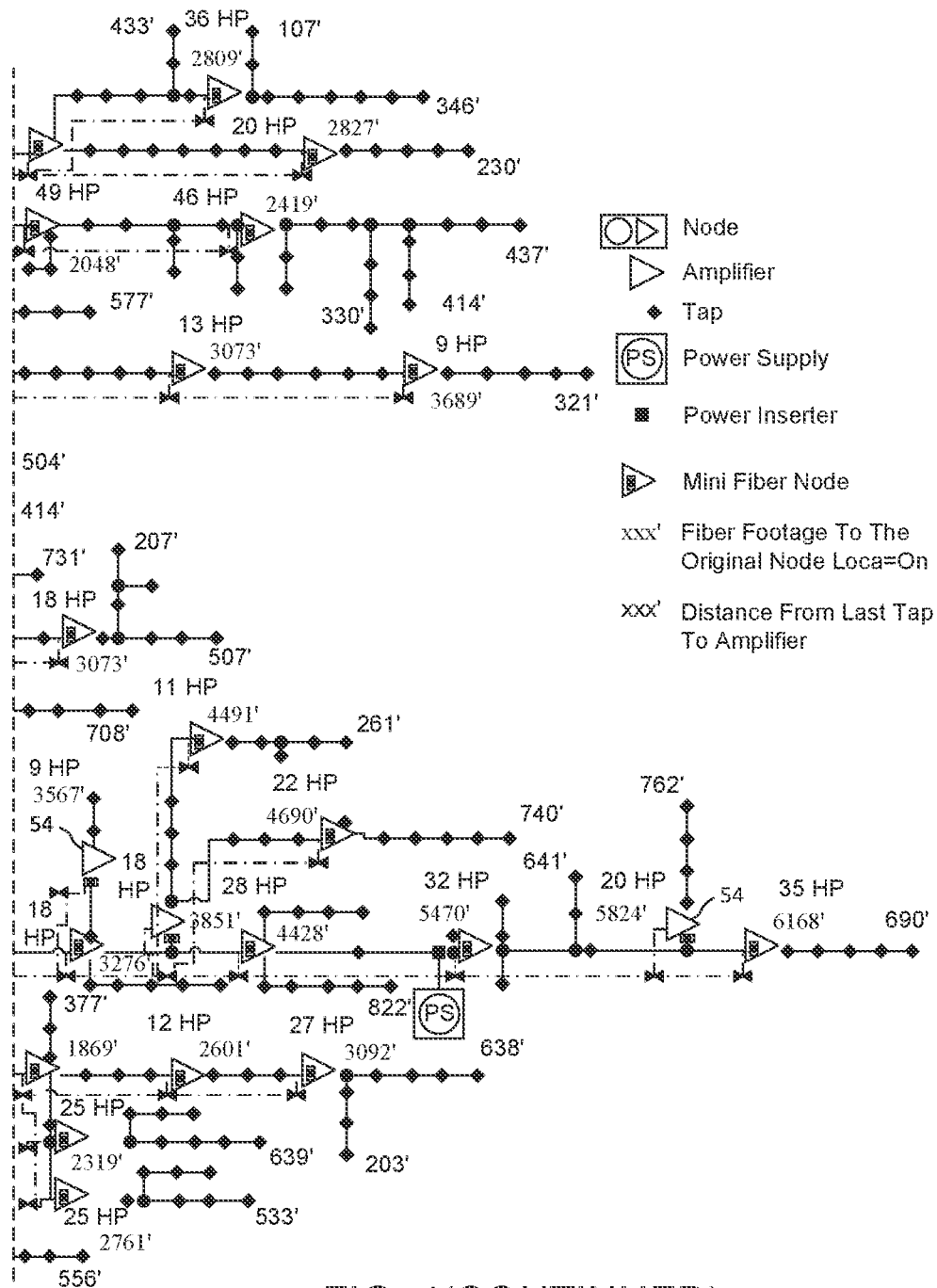

FIG. 4 shows a third alternative network upgrade architecture 50, which is also an N+0 architecture, but with different tradeoffs than the architecture 40 shown in FIG. 3. The number and position of actives is maintained, fiber is overlashed from node 51 to each active feeding taps by converting each of the amplifiers into "compact nodes" 52, as a result extending fiber even deeper into the HFC network, with no subscriber that is further than about 900 feet, in the example network considered. Furthermore, with 42 compact nodes 52 and just four service groups desired, a certain level of optical aggregation is employed, in the manner that "Gray Optics" Aggregators such as aggregator 56 interact with the Head-End/Hub, and then distribute locally to the subgroup of the compact nodes in an architecture that is sometimes called a "Distributed Node Architecture" (DNA). The aggregator 56, and the use thereof, is described in U.S. Pat. No. 10,211,922 B2, issued Feb. 19, 2019 which is incorporated herein by reference in its entirety. Since the number of nodes (42) for this upgrade is much larger than the target number (4) of service groups, it is advantageous from a cost-efficiency perspective to aggregate those nodes, roughly in 4 groups of 10 (with +/− adjustments) to capture fewer than about 250 HP in each of the service groups, as was already accomplished in the N+2 case.

Figure 5:
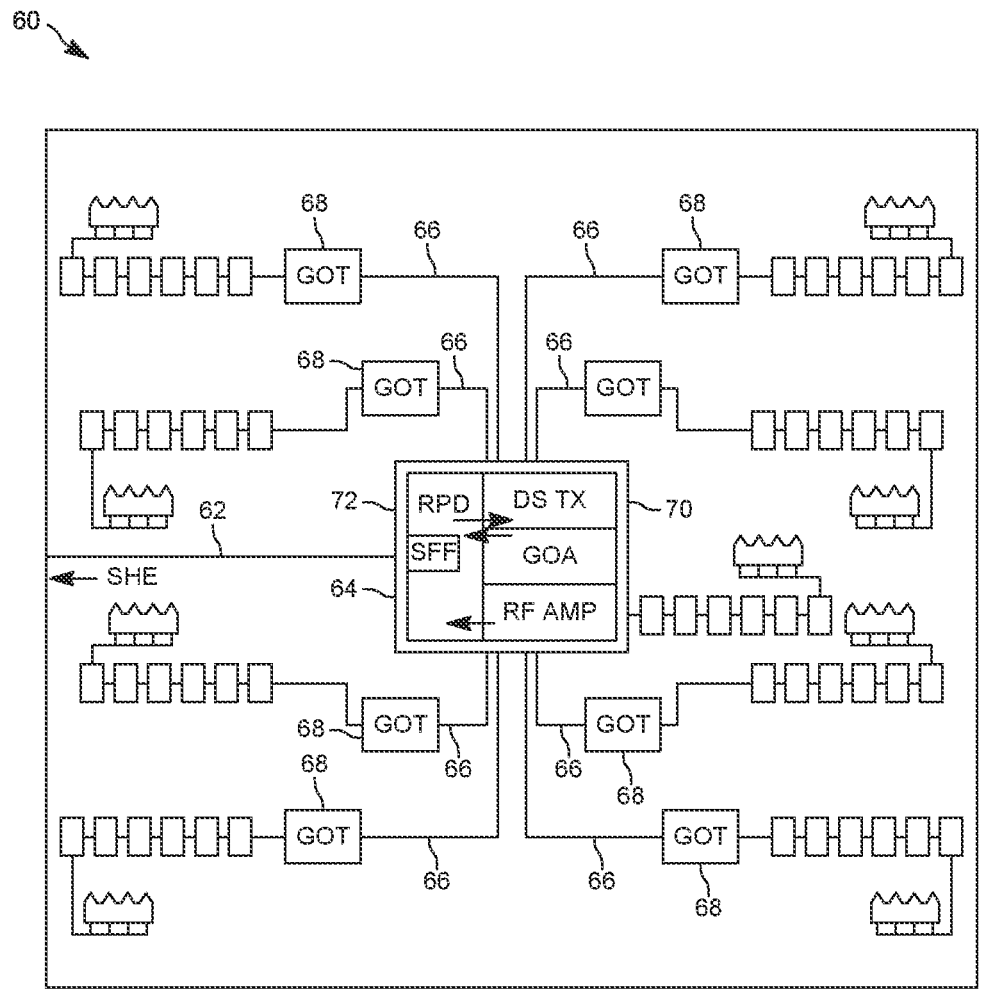
FIG. 5 shows a Gray-Optics Aggregation architecture as applied to the HFC system of FIG. 4.

FIG. 5 shows an aggregator topology 60 as used in the system of FIG. 4 where fiber optic cable route 62 extends from the Head-End or Hub to the "Aggregator" node 64—typically located where the original N+5 node was positioned in the network. The aggregator node 64 is linked via fiber optic cable routes 66 to all of the subtending "compact nodes" 68, labeled as "Gray Optics Terminals" (GOT). Only eight GOTs 68 are shown, but the total number for aggregator node 64 could be larger, and is commonly an exponent of 2, i.e. 4, 8, 16, etc. The centrally located aggregator node 64 is typically composed of an Remote PHY Device (RPD) whose downstream RF connections are linked to a downstream analog transmitter "DS TX" 70, followed by an optical splitter that feeds 4, 8 or up to 16 GOT nodes 68. In the upstream, return transmitters in the GOT node 68 return signals that are received 1:1 in the "Gray Optics Aggregator" 64 to be fed into the upstream RF input of the RPD 72 of the aggregator 64, The GOT nodes 68 typically receive an analog downstream signal and have a digital upstream transmitter, but analog upstream combining is also an option. Furthermore, if the RPD 72 of the aggregator 64 is a 2×2 or 4×4 configuration device, then a pair, or two pairs, of downstream transmitters could follow it, and similarly the number of upstream GOTs 68 could produce two or four RF inputs for a 2×2 or 4×4 RPD 72. The RPD 72 may be implemented as an "RMD" i.e., with Remote MAC&PHY instead of just remote PHY. The architecture described is preferably of the distributed kind, but in some embodiments a centralized option is also possible.

Figure 6:
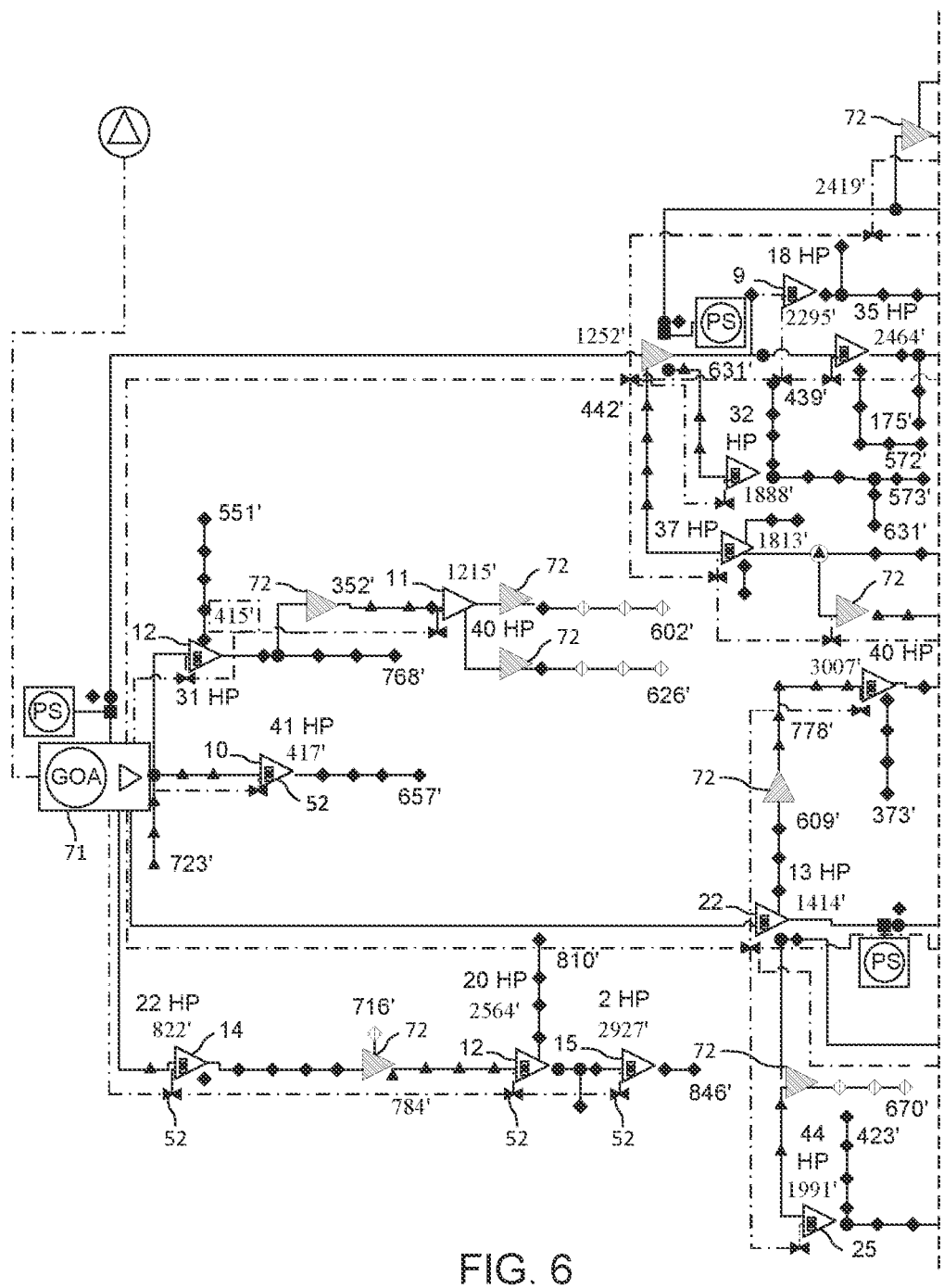
FIG. 6 shows the HFC system of FIG. 1 converted to an N+0 topology using a 29-node "Fiber-Enabled Backfeed" topology.
Figure 6:
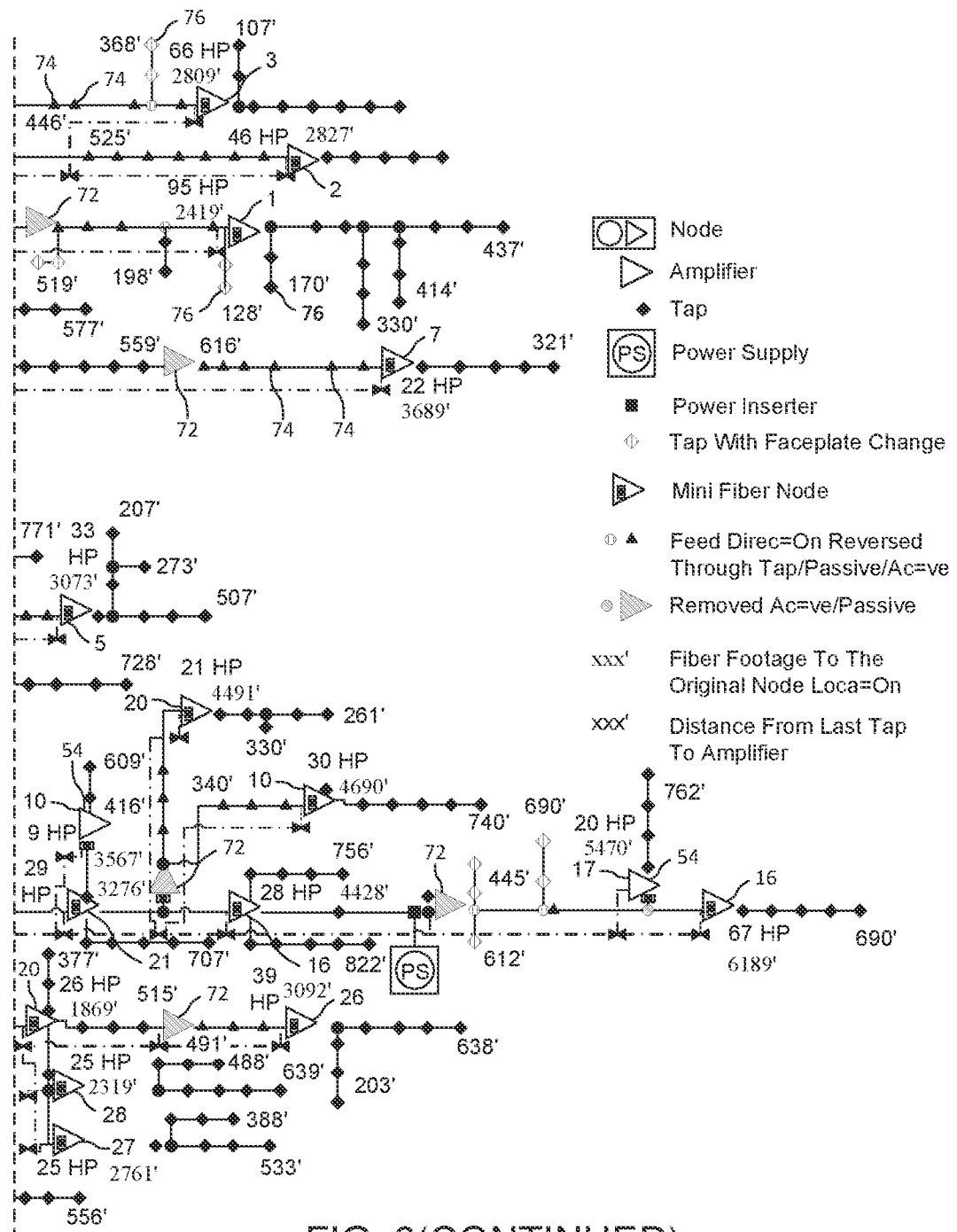

FIG. 6 shows an exemplary fiber-enabled backfeed architecture serviced by aggregation node 71, which improves on described Distributed Network Architecture (DNA), as 13 out of 42 (~30%) of DNA compact node locations 72 may be removed at the expense of needing to reverse taps or passives 74 and/or change faceplate values on taps or passives 76. These taps or passives that need to be changed in the system shown in FIG. 6 number 84 out of 286 (~30%). This trade-off, however, reduces the upgrade cost, both in material and labor because of the cost of having to install 30% fewer nodes is lower than the cost of replacing 30% of tap/passive faceplates, with both material and labor considered. Other potential benefits of the proposed invention are that it reduces total plant power compared to DNA; and the upgrade requires less time to accomplish than traditional N+0 (and DNA).

The architecture shown in FIG. 6 may be referred to as a "Fiber-Enabled BackFeed" architecture or "Backfeed Facilitated by Fiber" (BFF) because of the new fiber overlash along a segment with taps originally going to an amplifier input—now getting reversed with "back-feed" to cover the segment preceding the compact node that gets installed instead and that will feed homes both in the forward and the reverse direction. The methodology of deciding what amplifier locations to keep and convert to compact nodes and which ones to eliminate and reverse the taps in the span following may in some embodiments be implemented using the following steps:

A. In a typical "N+K" network that's getting upgraded, where K is an integer (and K≥3 typically), the last amplifier location is preserved, with a compact node replacing it;

B) the input span that was feeding the last amplifier in the cascade is directionally reversed and signal-fed from the last amplifier location;

C) the next to last amplifier then becomes superfluous and as such, it gets removed;

D) for the power-delivery continuity of the hardline, a special passive device, which terminates RF signal flows but passes AC power, is inserted E) the process is repeated with a second-to-last amplifier location in the cascade, which stays, and the one prior to it gets removed.

Given the above methodology, the Fiber-Enabled Backfeed N+0 upgrade will provide even further cost savings on networks where K is an even number (2, 4, 6, etc) than in networks where K is an odd number (3, 5, etc). Nevertheless, as FIG. 6 shows, with a mix of K even and K odd runs, the overall savings, in this case of 30% of field actives' locations is quite significant.

While the N+0 plant will have plenty of capacity for years to come, there may eventually come a time when these compact nodes are upgraded to even higher Extended Spectrum (ESD) frequencies, such as 3 GHz to support ~25 Gbps data rates. Work is ongoing to define 3 GHz taps today. These super high frequencies are very sensitive to the type and length of the coax cable. As a result, some longer spacings between amplifiers might force a re-spacing.

When pulling fiber for these compact nodes, an operator might also consider pulling higher quality coax cable to replace the existing cable in anticipation of these ESD frequencies. The coax overlay may also allow the tap replacements to be done with minimal impact (i.e., downtime) for existing customers.

Figure 8:
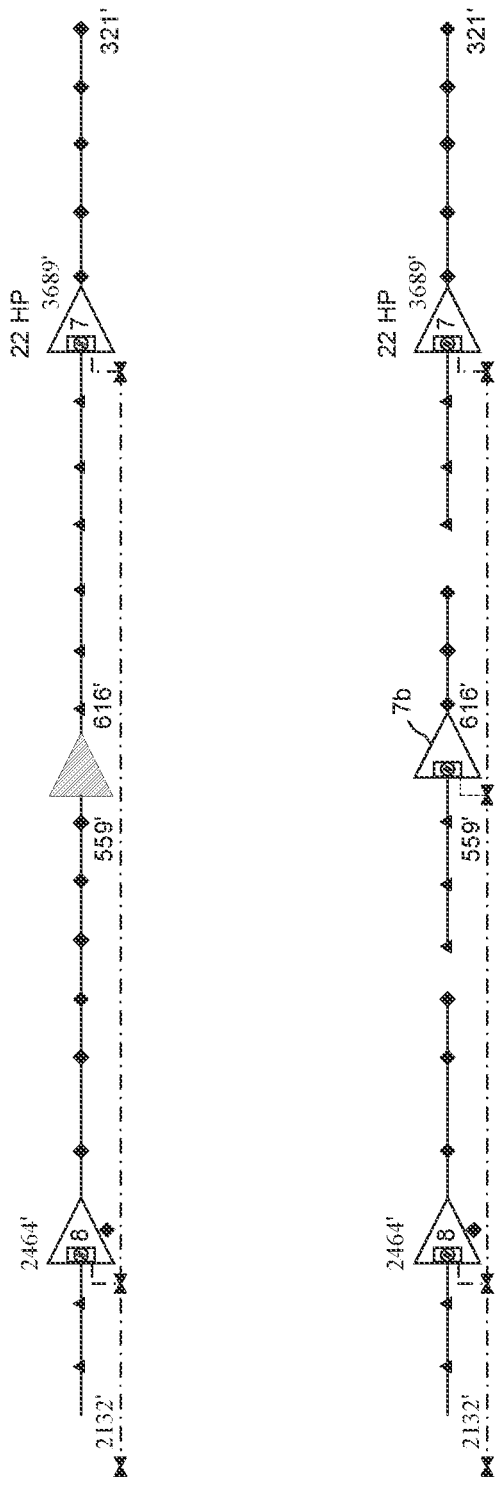
FIG. 8 illustrates how the system of FIG. 6 reduces the maximum amplifier-to-tap coaxial distance.

As an alternative to re-spacing amplifiers or overlaying coax, another disclosed solution is to split the coax segment under consideration into two segments (i.e. split a six-tap segment into two 3-tap segments); and then add another ESD compact node at the empty amplifier location, as shown in FIG. 8. For example, one 3-tap segment is driven from the forward direction of one ESD compact while the other 3-tap coax segment is driven from the back-feed of the other ESD compact node. Hence our solution is very adaptable to future ultra-high ESD frequencies without requiring the need for mid-span amplifiers as many are proposing today.

Figure 7:
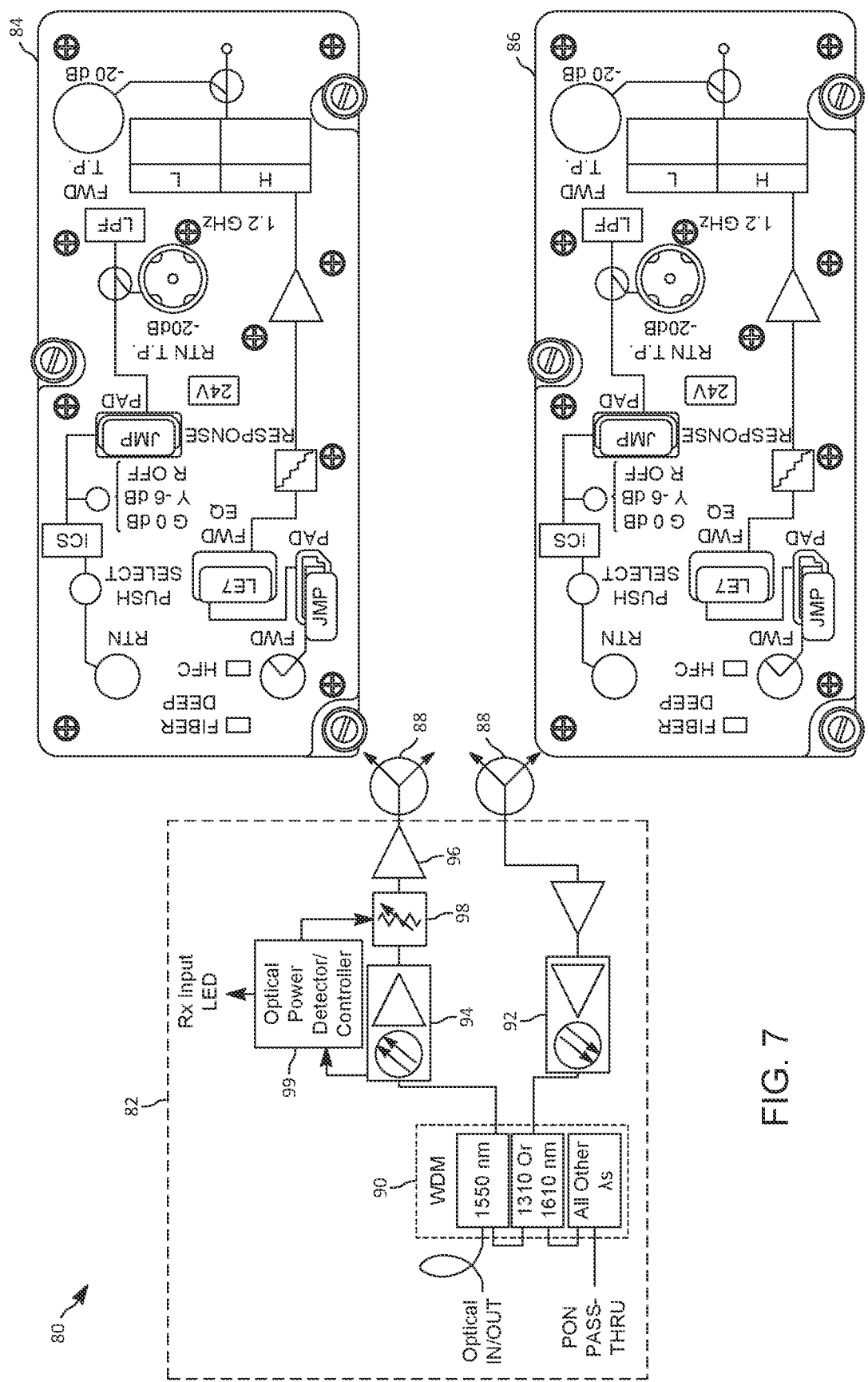
FIG. 7 shows a compact node used in the system of FIG. 6.

FIG. 7 shows an exemplary implementation 80 of a compact node, such as the compact nodes 52 shown in FIGS. 4 and 6. This implementation may generally be seen as a combination of an optical network unit (ONU) portion 82 connected to two RF modules 84 and 86, connected to each other by splitters 88. The RF module 84 may, for example, exchange forward path signals with the ONU portion 82 while the RF module 86 exchanges return path signals with the ONU portion 82. The ONU portion 82 may include a wavelength division multiplexer 90 that multiplexes/demultiplexes received signals into various frequency bands, e.g. 1550 nm, 1310 nm (or 1610 nm), and all other bands. The ONU portion may also include a photodiode 92 that receives return path signals from RF unit 86 and sends these signals to WDM 90, as well as a laser 94 that receives signals from WDM 90 and forwards them to the RF module 84 after optional amplification 96 and attenuation 98. The laser (transmitter 94, as well as the amplifier 96 and attenuator 98) may optionally be controlled by controller 99. The RF modules shown in FIG. 7 are commonly-utilized "power doubler" gain stages in the downstream direction, coupled with an appropriately chosen gain block for the upstream direction, with sufficient gain and sufficient total composite power to support the selected split, e.g. 204/258 MHz for DOCSIS 3.1, or 300/396 MHz, 396/492 MHZ, etc. as envisioned in DOCSIS 4.0 PHY.

Those of ordinary skill in the art will appreciate that, although FIG. 7 shows a single fiber with two wavelengths (1550 nm downstream and 1310 nm or 1610 nm upstream) provided through the compact node. Nevertheless, a two-fiber option is also fully viable, i.e., with a separate fiber providing the downstream signal and a separate fiber receiving the upstream signal.

The methodology, described above, for which of the field active locations to keep and which to eliminate, and the resulting implementation illustrated in FIG. 6 provides significant cost savings relative to other network evolution upgrades. Some embodiments may provide further improvements. As described above with respect to FIG. 7, the BFF compact node may preferably have more than one output because, in addition to the at least one amplifier output it is replacing, it will backfeed the input segment to that amplifier. The resulting compact node configuration, with analog optical front end and two output "RF modules" is shown in FIG. 7. The RF splitters/combiners after/before Forward/Return Optical Network Unit (ONU) front gain blocks are therefore depicted to show how their signals are respectively split in the forward direction to the two gain blocks, and combined in the return direction from the two gain blocks. Other variants with more RF outputs are also possible.

The front ONU portion 82 in FIG. 7, and particularly its return laser 94 are shown in analog implementation. However, other embodiments may implement the ONU portion 82 in a digital domain. The fiber routing for compact nodes 52 can be performed in a traditional way of using fiber-splice enclosures (FOSC) next to the compact nodes 52. Alternatively, co-pending application Ser. No. 16/126,569 filed on Sep. 10, 2018 and entitled "Node-Fiber Connectorization," the contents of which are hereby incorporated by reference in its entirety, discloses a technique of cost-effectively splicing the compact nodes.

The aggregation node, in its current product implementation, can aggregate up to 32 compact nodes, using Virtual Hub (vHub) modules and/or up to 8 digital-return based modules. Nevertheless, the number of digital returns signals can be increased beyond 8, by adding and summing digital receivers. The BFF architecture can also be partially implemented by e.g. using the methodology and devices as previously described, but within an BFF N+1 architecture instead of a BFF N+0 architecture described above and as shown in FIG. 6. For that case, it may be preferable to use the systems and methods described in U.S. Patent Application Publication No. 2016/0043806 filed on Feb. 11, 2016 and titled "Segmentable Optical Node Module Configurable as an RF Amplifier and Corresponding Methods and Systems," which is hereby incorporated by reference in its entirety. This document teaches a) using a segmentable node housing and RF tray and b) instead of optical TX/RX pair, utilizing a "Front RF" module that may be easily upgraded to a node, when the need for such change arrives.

It is implicitly assumed in the foregoing disclosure that the field active power still arrives via a coaxial plant and that AC continuity of the hardline plant has to be maintained. That is a simple task in the previous amplifier locations that get converted to the compact nodes. Nevertheless, in the amplifier locations that are eliminated using the foregoing disclosure, there is a need to add a "power-passing" device, inductively coupled in-line, with capacitively coupled RF termination provided for RF signals arriving from either direction. For HFC networks, the AC is ~60 Hz, while RF starts at 5 MHz. This "power passing" device is a new device specific to BFF upgrade, however, it bears similarity to "line power inserter" HFC devices, with power and signal ports switched around.

Those of ordinary skill in the art will appreciate that, although the foregoing systems and methods were illustrated with respect to a desired N+0 architecture, the described systems and methods may be partially implemented, or implemented in stages over time. There are several migration strategies that can be used over time. For example, rather than directly implementing the N+0 solution as shown in FIG. 6, an operator could implement a partial N+2 upgrade that is a step on a path to N+0 BFF. Furthermore, those of ordinary skill in the art will recognize that with respect to FIG. 3, in an N+2 upgrade, that nodes A, B, C, D, E, and F already align with compact nodes on FIG. 6, and can be implemented as compact nodes as a first step towards an N+0 BFF architecture. The remaining two of the eight nodes in FIG. 3 would require a slight modification. Note that this approach of starting with N+2 upgrade achieves the major benefit of reduced SG sizes, while postponing the remaining upgrades for years to come.

As another example of an incremental migration strategy, sometimes the N+0 upgrade is needed for a select few customers (e.g. business customer &/or Top Tier residential customer). Another way to implement this solution is with a "surgical strike" that only brings the fiber and the BFF upgrade to the amplifiers where the upgraded service is required. In this way, the upgrade costs are handled on-demand when the need arises.

Figure 9:
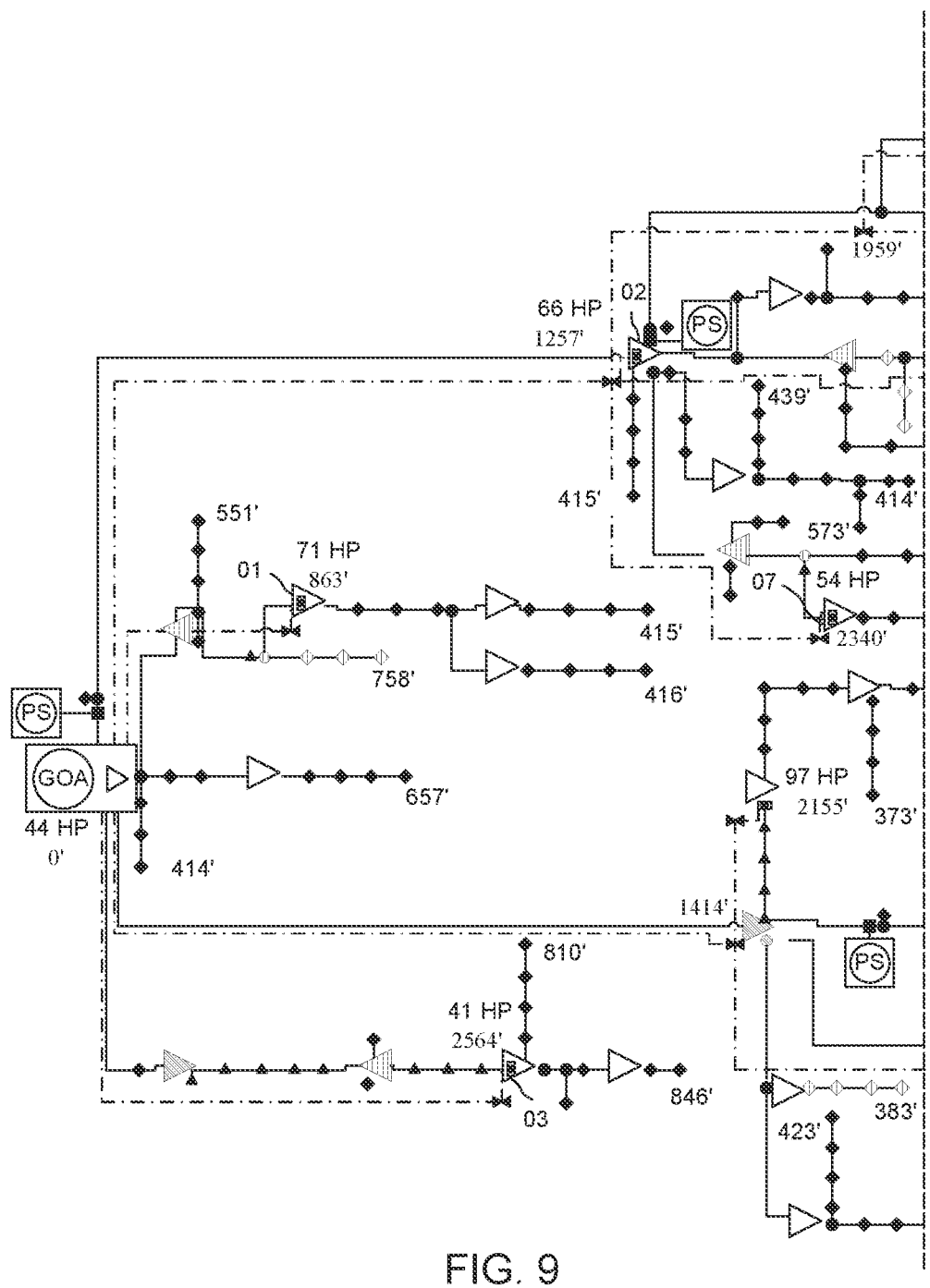
FIG. 9 shows the system of FIG. 1 upgraded to a Fiber Enabled Backfeed N+0 topology.
Figure 9:
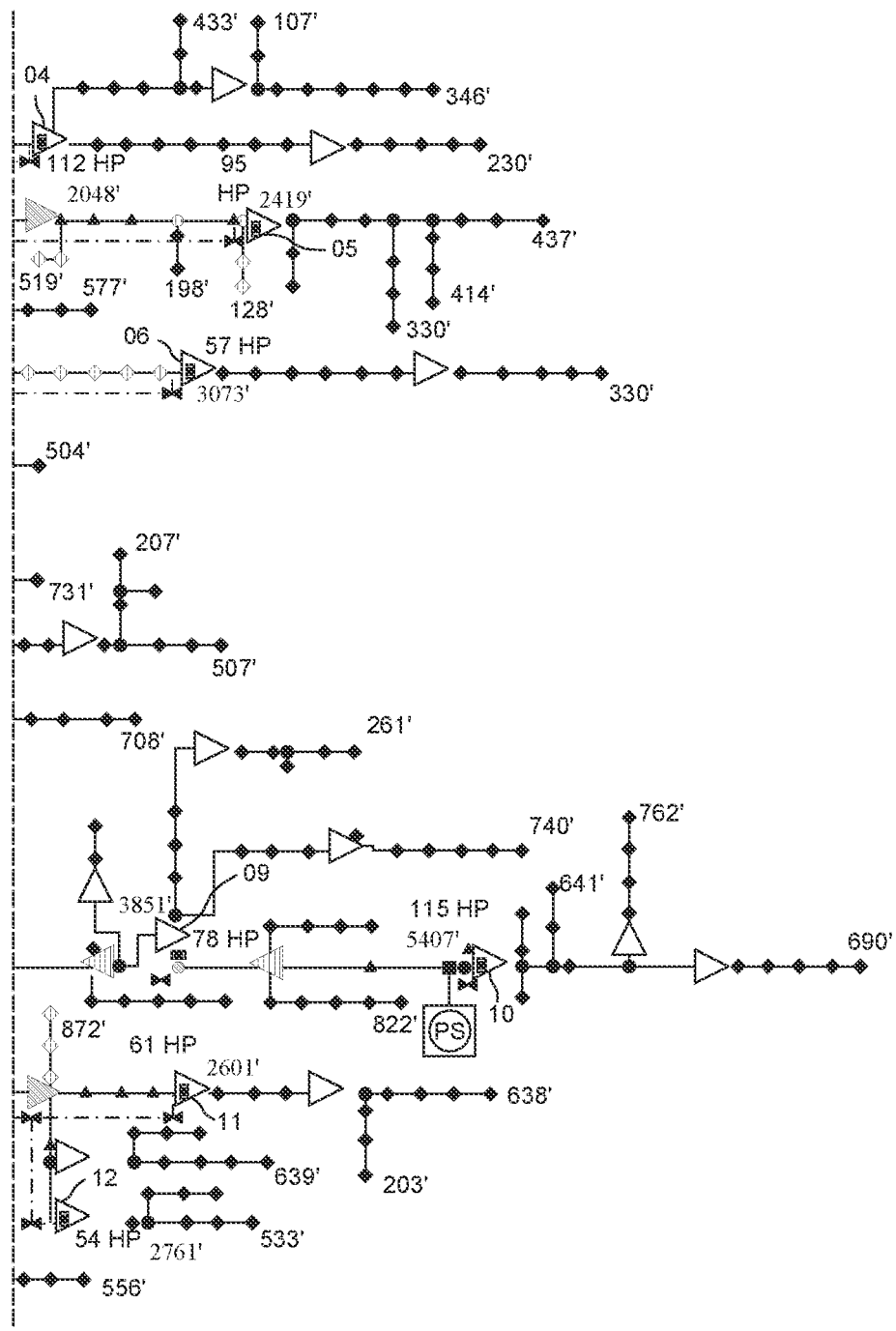

Table 3 below cross-compares the most significant attributes for the various network architecture upgrade options described in the present disclosure. The tradeoffs between number of compact node actives and the number of tap faceplate changes (the lower the better for both) are highlighted. The proposed architecture can also be combined with the traditional cascade reduction approach. For example, FIG. 9 illustrates a hybrid approach of a BFF upgrade, however with one RF amplifier left in a cascade, thus N+1 BFF. Per comparisons in Table 3, this approach sits in between the N+2 and N+0, in terms of additional fiber overlash required, cost of the upgrade and the relative power consumption estimate, and thus offers another option for the operators looking for a particular set of tradeoffs enabled by this hybrid approach.

TABLE 3

| Architecture | N + 5 | N + 2 | N + 0 FD | N + 0 "DNA" | N + 0 "BFF" | N + 1 "BFF" |
|---|---|---|---|---|---|---|
| Number of Standard Nodes | 1 | 8 | 15 | 0 | 0 | 0 |
| Number of RF amps | 42 | 34 | 0 | 0 | 0 | 26 |
| Number of Taps | 286 | 286 | 286 | 286 | 286 | 286 |
| Number of Aggregation Nodes |  | 1 | 2 | 2 | 2 | 2 |
| Number of "compact Nodes" |  |  |  | 42 | 29 | 12 |
| Number of tap faceplate changes required |  | 15 | 208 | 0 | 84 | 46 |
| New plant; miles/% |  | 1.9/19% | 6.5/67% | 5.3/55% | 5.3/55% | 3.2/33% |
| Fiber to the last subscriber | <7,000 ft | <2,500 ft | <1,600 ft | <900 ft | <900 ft | <1,500 ft |
| Rel. Pwr Consuption % | 89% | 100% | 77% | 76% | 70% | 85% |
| Relative Upgrade Cost % |  | 100% | 186% | 168% | 163% | 117% |

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A system comprising:
   (a) an aggregator node that receives downstream signals from a head end and sends upstream signals to the head end;
   (b) at least one compact node that receives downstream signals from the aggregator node and sends upstream signals to the aggregator node; where
   (c) the compact node sends the downstream signal received from the aggregator node to a subscriber positioned in the upstream direction relative to the compact node.

2. The system of claim 1 where the compact node sends the downstream signal received from the aggregator node to a subscriber positioned in the downstream direction relative to the compact node.

3. The system of claim 1 located in an N+0 CATV network.

4. The system of claim 1 located in an N+x network where X is greater than 0.

5. The system of claim 1 including a second compact node that sends the downstream signal received from the aggregator node to a subscriber positioned in the upstream direction relative to the compact node.

6. The system of claim 5 where the compact node and the second compact node are adjacent each other.

7. The system of claim 1 where the compact node comprises an optical network unit (ONU) portion and a plurality of RF modules.

8. The system of claim 7 where each of the RF modules comprise power doubler gain stages in the downstream direction and a gain block in the upstream direction.

9. The system of claim 1 where the compact node has more than one output for the downstream signal received from the aggregator node.

10. The system of claim 1 including a plurality of compact nodes, where each one of the plurality of compact nodes sends the downstream signal received from the aggregator node to a subscriber positioned in the upstream direction relative to the respective one of the plurality of compact nodes.

* * * * *